United States Patent
Westerhoff et al.

(10) Patent No.: US 10,354,154 B2
(45) Date of Patent: Jul. 16, 2019

(54) METHOD AND A DEVICE FOR GENERATING AN OCCUPANCY MAP OF AN ENVIRONMENT OF A VEHICLE

(71) Applicant: Delphi Technologies, LLC, Troy, MI (US)

(72) Inventors: Jens Westerhoff, Dortmund (DE); Jan Siegemund, Cologne (DE); Mirko Meuter, Erkrath (DE); Stephanie Lessmann, Erkrath (DE)

(73) Assignee: DELPHI TECHNOLOGIES, LLC, Troy, MI (US)

( * ) Notice: Subject to any disclaimer, the term of this patent is extended or adjusted under 35 U.S.C. 154(b) by 0 days.

(21) Appl. No.: 15/946,939

(22) Filed: Apr. 6, 2018

(65) Prior Publication Data

US 2018/0300560 A1    Oct. 18, 2018

(30) Foreign Application Priority Data

Apr. 13, 2017  (EP) .................... 17166468

(51) Int. Cl.

| G06K 9/00 | (2006.01) |
|---|---|
| G06F 19/00 | (2018.01) |
| G06T 7/269 | (2017.01) |
| G06T 7/00 | (2017.01) |
| G06F 17/18 | (2006.01) |
| G06N 7/00 | (2006.01) |

(52) U.S. Cl.
CPC ......... *G06K 9/00805* (2013.01); *G06F 17/18* (2013.01); *G06K 9/00791* (2013.01); *G06N 7/00* (2013.01); *G06T 7/269* (2017.01); *G06T 7/97* (2017.01); *G06T 2207/10028* (2013.01); *G06T 2207/30252* (2013.01)

(58) Field of Classification Search
USPC .......... 382/100, 103–17, 154–155, 162, 168, 382/173, 181, 199, 219, 224, 232, 254, 382/274, 276, 285–291, 305, 312, 321; 348/46; 701/2, 3, 117
See application file for complete search history.

(56) References Cited

U.S. PATENT DOCUMENTS

| 2012/0323474 A1* | 12/2012 | Breed | B60W 30/04 701/117 |
|---|---|---|---|
| 2014/0071240 A1* | 3/2014 | Chen | G06T 7/70 348/46 |
| 2015/0197007 A1* | 7/2015 | Pack | G05D 1/0038 701/2 |

(Continued)

*Primary Examiner* — Seyed H Azarian
(74) *Attorney, Agent, or Firm* — Lawrence D. Hazelton

(57) ABSTRACT

A method of generating an occupancy map representing free and occupied space around a vehicle, wherein the occupancy map is divided into a plurality of cells Mx,y, the method includes: capturing two consecutive images by a camera mounted on the vehicle; generating optical flow vectors from the two consecutive images; estimating 3D points in the space around the vehicle from the optical flow vectors; generating rays from the camera to each of the estimated 3D points, wherein intersection points of the rays with the cells Mx,y defining further 3D points; determining for each of the cells Mx,y a function $L\_(x,y)\hat{\ }t$ for a time step t; and determining an occupancy probability from the function $L\_(x,y)\hat{\ }t$ for each of the cells Mx,y.

12 Claims, 7 Drawing Sheets

(56) References Cited

U.S. PATENT DOCUMENTS

| | | | |
|---|---|---|---|
| 2016/0070265 A1* | 3/2016 | Liu | B64C 39/024 |
| | | | 701/3 |
| 2018/0188045 A1* | 7/2018 | Wheeler | G01C 21/32 |
| 2018/0190016 A1* | 7/2018 | Yang | G06T 7/11 |

* cited by examiner

METHOD AND A DEVICE FOR GENERATING AN OCCUPANCY MAP OF AN ENVIRONMENT OF A VEHICLE

TECHNICAL FIELD OF INVENTION

The invention concerns a method and a device for generating an occupancy map representing free and occupied space around a vehicle.

BACKGROUND OF INVENTION

Building a map of the environment of the vehicle while driving is crucial for different high level applications related to driver assistance systems and the field of autonomous driving. A detailed representation of the free space/occupied space around the vehicle provides the basis for systems like path planning, emergency braking, collision warning, etc. The information about the environment in this 2D map is represented by an occupancy probability of the different cells in this map, e.g. with a cell of size 20 cm×20 cm.

Many systems in this field of research rely on stereo-camera, LIDAR (light detection and ranging) or radar based sensors which are expensive and/or hard to handle. An approach often used in literature is the determination of free space in front of the vehicle by "semantic segmentation". This approach is image-based and requires a large labeled (with ground truth information) database for the training of a classifier. Often the classifiers are trained on regions with asphalt look like or similar texture. After training related to asphalt it is hard for the classifier to detect lawn as free space. But for the planning of collision avoidance maneuvers the detection of lawn as free space can be lifesaving.

SUMMARY OF THE INVENTION

Described herein is an effective method of generating an occupancy map representing free and occupied space around a vehicle with low effort, and a device for generating an occupancy map representing free and occupied space around a vehicle.

In one aspect of the invention a method of generating an occupancy map representing free and occupied space around a vehicle is provided, wherein the occupancy map is divided into a plurality of cells $M_{x,y}$. According to the method, two consecutive images are captured by a camera mounted on the vehicle while the vehicle is moving. Optical flow vectors are generated from the two consecutive images and 3D points are estimated in the space around the vehicle from the optical flow vectors. For example, conventional structure from motion (SfM) technique may be employed to estimate the 3D points in the environment of the vehicle from the optical flow vectors. Rays from the camera to each of the estimated 3D points are then generated. For example, conventional ray tracing technique may be employed to generate the rays. The cells $M_{x,y}$ may be defined in a plane, for example, the x-y-plane. The cells $M_{x,y}$ further extend from the plane orthogonally into the 3D space and thus structure the 3D space around the vehicle. Intersection points of the rays with the cells $M_{x,y}$ in the 3D space around the vehicle define further 3D points.

For each of the cells $M_{x,y}$ a function $L_{x,y}^{t}$, in particular a so-called log-odds ratio, is determined for a time step t:

$$L_{x,y}^{t} = L_{x,y}^{t-1} + \Sigma_i \log \frac{P(M_{x,y} \mid h_i, d_i)}{1 - P(M_{x,y} \mid h_i, d_i)}, \quad (1)$$

wherein i denotes the 3D points located within the respective cell $M_{x,y}$ and each of the 3D points i is defined by a height $h_i$ above ground and a distance $d_i$ between the 3D point i and a 3D point on the respective ray where the ray hits the ground or an object. $L_{x,y}^{t-1}$ is the function or the log-odds ratio for the time step t−1. The 3D points estimated in the space around the vehicle from the optical flow vectors and the 3D points defined by intersection points of the rays with the cells $M_{x,y}$ contribute to equation (1).

The term $P(M_{x,y} \mid h_i, d_i)$ is a function of the term $$\Sigma_S \; P(M_{x,y} \mid S, h_i) \; \frac{L(S \mid d_i)}{\Sigma_S \; L(S \mid d_i)}.$$

In particular, the term $P(M_{x,y} \mid h_i, d_i)$ is given by $$P(M_{x,y} \mid h_i, d_i) = \Sigma_S \; P(M_{x,y} \mid S, h_i) \frac{L(S \mid d_i)}{\Sigma_S \; L(S \mid d_i)}, \quad (2)$$

wherein $P(M_{x,y} \mid S, h_i)$ is an occupancy probability contribution of a 3D point i dependent on a status S of the 3D point i and the height $h_i$, $L(S \mid d_i)$ is a likelihood of the status of the 3D point i dependent on the distance $d_i$, and S={hit, pass, covered}.

If a 3D point either represents an object or ground, the status S of the 3D point is S=hit in a probability-based sense. If the 3D point is located between the camera and the 3D point on the respective ray where the ray hits the ground or an object, the status S of the 3D point is S=pass in a probability-based sense. If the 3D point is located on the respective ray beyond the 3D point on the respective ray where the ray hits an object, the status S of the 3D point is S=covered in a probability-based sense.

Finally, an occupancy probability is determined from the function $L_{x,y}^{t}$ for each of the cells $M_{x,y}$.

The complete occupancy map may be initialized by $L_{x,y}^{t}=0$ at time t=0.

In comparison to conventional methods the method according to the invention does not suffer from the aforementioned training problem because it needs no training at all. Put simply, it may use conventional SfM technique to determine 3D points in the environment and convert it to an environmental occupancy map.

The estimated 3D points from SfM estimation and a ray tracing algorithm may be used to gather as much information as possible of the environment. The method according to the invention is then able by considering all collected information to do a direct probability-based transformation of 3D information to an occupancy map.

The only sensors used for the mapping approach in this invention are a single forward-looking camera and a simple velocity sensor, for example a standard wheel-based velocity sensor.

In a further embodiment, the term $P(M_{x,y} \mid h_i, d_i)$ is given by $$P(M_{x,y} \mid h_i, d_i) = \phi_{Th}\phi_{Td} + \phi_{Dh}\phi_{Dd} + \phi_{Vh}\phi_{Vd} \quad (3)$$

with functions $\phi_{Th}$, $\phi_{Dh}$ and $\phi_{Vh}$ each generating a probability and functions $\phi_{Td}$, $\phi_{Dd}$ and $\phi_{Vd}$ each generating a likelihood depending on $h_i$ and $d_i$:

$$\phi_{Th} = P(M_{x,y} \mid S = \text{hit}, h_i), \quad (4)$$

-continued $$\phi_{Dh} = P(M_{x,y} \mid S = \text{pass}, h_i), \quad (5)$$

$$\phi_{Vh} = P(M_{x,y} \mid S = \text{covered}, h_i), \quad (6)$$

$$\phi_{Td} = \frac{L(S = \text{hit} \mid d_i)}{L(S = \text{hit} \mid d_i) + L(S = \text{pass} \mid d_i) + L(S = \text{covered} \mid d_i)}, \quad (7)$$

$$\phi_{Dd} = \frac{L(S = \text{pass} \mid d_i)}{L(S = \text{hit} \mid d_i) + L(S = \text{pass} \mid d_i) + L(S = \text{covered} \mid d_i)}, \text{ and} \quad (8)$$

$$\phi_{Vd} = \frac{L(S = \text{covered} \mid d_i)}{L(S = \text{hit} \mid d_i) + L(S = \text{pass} \mid d_i) + L(S = \text{covered} \mid d_i)}. \quad (9)$$

The function $\phi_{Th}$ may be an inverted Gaussian function with a minimum at $h_i=0$.

The function $\phi_{Vh}$ may assume a constant value for all values of $h_i$. The constant value may be 0.5.

The function $\phi_{Dh}$ may have a minimum in a first range for $h_i$ around $h_i=0$. Further, the function $\phi_{Dh}$ may assume 1 for values of $h_i$ that are smaller than the first range and may assume the constant value for values of $h_i$ that are greater than the first range.

The function $\phi_{Td}$ may be a Gaussian function with a maximum at $h_i=0$.

The function $\phi_{Dd}$ may have a transition area for values of $d_i$ in a second range around $d_i=0$ where the function $\phi_m$ may rise from 0 to 1. Further, the function $\phi_{Dd}$ may assume 0 for values of $d_i$ that are smaller than the second range and may assume 1 for values of $d_i$ that are greater than the second range.

The function $\phi_{Vd}$ may have a transition area for values of $d_i$ in the second range around $d_i=0$ where the function $\phi_{Vd}$ may fall from 1 to 0. Further, the function $\phi_{Vd}$ may assume 1 for values of $d_i$ that are smaller than the second range and may assume 0 for values of $d_i$ that are greater than the second range.

In yet a further embodiment, the occupancy probability is determined from the function $L_{x,y}^t$ for each of the cells $M_{x,y}$ by $$P^t(M_{x,y}) = 1 - \frac{1}{1 + e^{L_{x,y}^t}}. \quad (10)$$

The occupancy map generated by the method described herein may be used as an input for a driver assistance system and/or a system for autonomous driving, in particular a system for path planning for autonomous driving, a system for obstacle detection, a system for lane departure warning, a system for forward collision warning and/or a system for autonomous emergency braking. Further, the occupancy map may be used for controlling the aforementioned systems, in particular for controlling the actuators, e.g., steering and braking.

According to a further aspect of the invention, a device for generating an occupancy map representing free and occupied space around a vehicle is provided, wherein the occupancy map is divided into a plurality of cells $M_{x,y}$. The device is configured to receive two consecutive images captured by a camera mounted on the vehicle, generate optical flow vectors from the two consecutive images, estimate 3D points in the space around the vehicle from the optical flow vectors, generate rays from the camera to each of the estimated 3D points, wherein the cells $M_{x,y}$ structure the space around the vehicle and intersection points of the rays with the cells $M_{x,y}$ in the space around the vehicle define further 3D points, and determine for each of the cells $M_{x,y}$ a function $L_{x,y}^t$ for a time step t, in particular according to equations (1) and (2). In addition, the device is configured to determine an occupancy probability from the function $L_{x,y}^t$ for each of the cells $M_{x,y}$.

The device may comprise the embodiments disclosed above in connection with the method of generating an occupancy map representing free and occupied space around a vehicle.

According to yet a further aspect of the invention, a system comprises the aforementioned device for generating an occupancy map as well as a driver assistance system and/or a system for autonomous driving, wherein the occupancy map generated by the device is input in the driver assistance system and/or the system for autonomous driving. Further, the occupancy map may be used for controlling the driver assistance system and/or the system for autonomous driving. In particular, the driver assistance system and/or the system for autonomous driving may comprise a system for path planning for autonomous driving, a system for obstacle detection, a system for lane departure warning, a system for forward collision warning and/or a system for autonomous emergency braking. Further, the occupancy map may be used for controlling the aforementioned systems, in particular for controlling the actuators, e.g., steering and braking.

BRIEF DESCRIPTION OF DRAWINGS

The invention will be described in more detail in the following in an exemplary manner with reference to an embodiment and to the drawings. There are shown in these.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
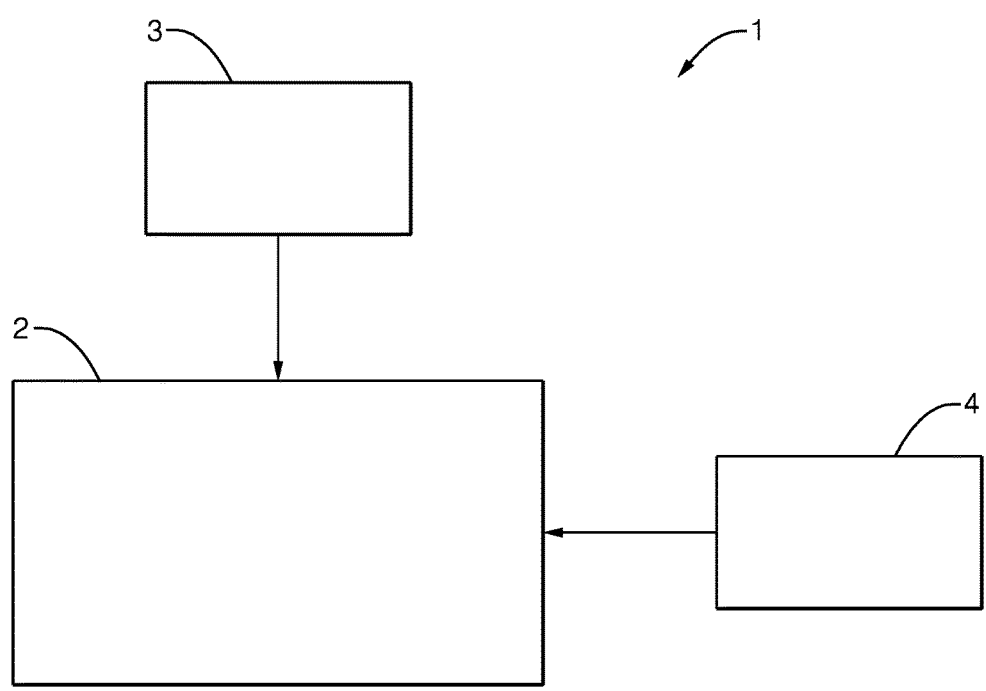
FIG. 1 a schematic representation of a system for generating an occupancy map representing free and occupied space around a vehicle.

FIG. 1 illustrates a system 1 that allows generating an occupancy map representing free and occupied space around a vehicle. The system 1 includes a device 2, a camera 3 and a velocity sensor 4. The camera 3 is mounted on a vehicle and captures images of the area in front of the vehicle. The velocity sensor 4, which may be a standard wheel-based velocity sensor, measures the velocity of the vehicle. The camera 3 and the velocity sensor 4 provide the device 2 with the captured images and the measured velocity data, respectively. The device 2 uses the captured images and the measured velocity data in order to generate and, in particular, update the occupancy map representing free and occupied space around the vehicle. For that purpose, the device 2 may include a processor and employs the method of generating an occupancy map explained in the following.

Figure 2:
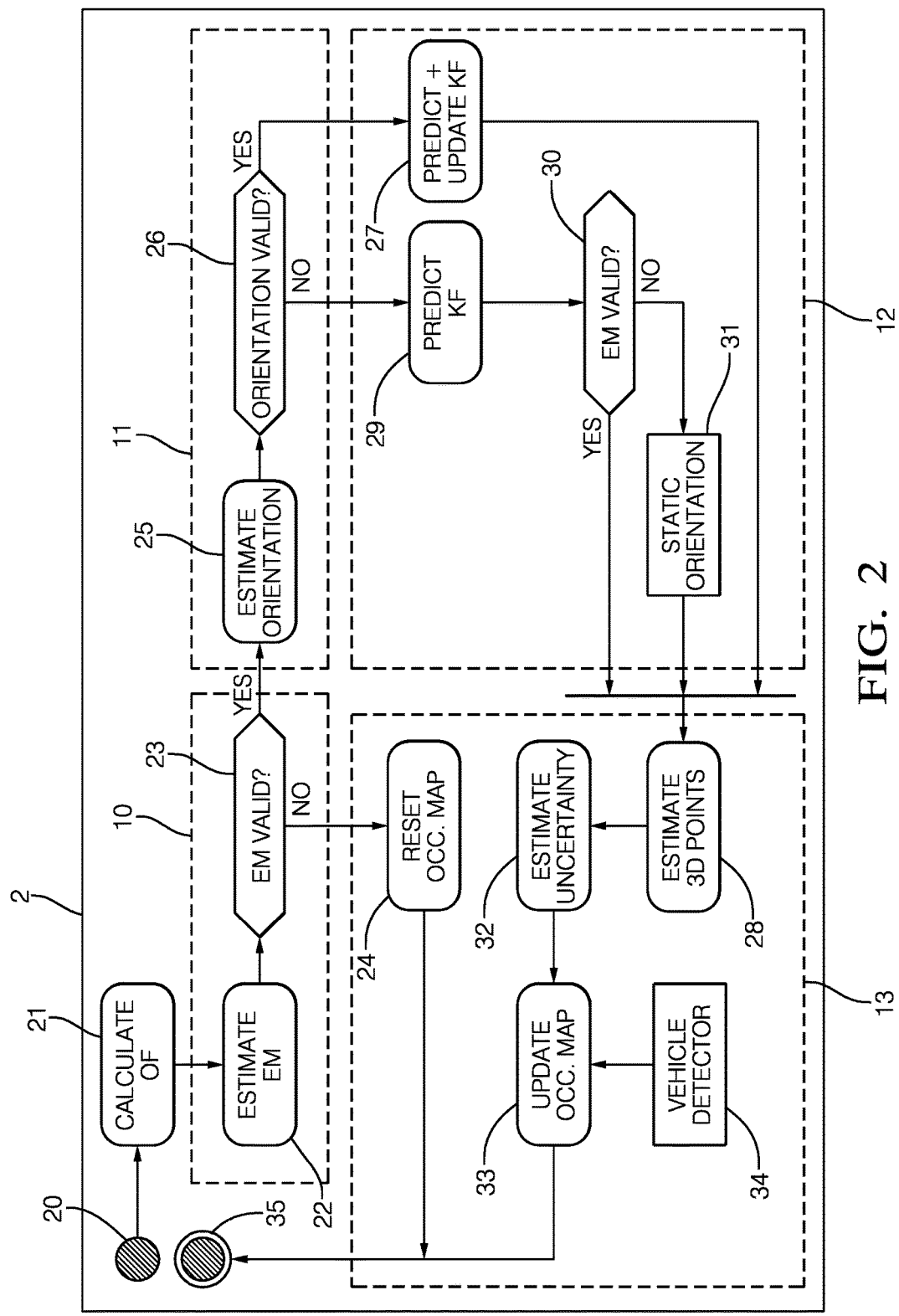
FIG. 2 a schematic representation of a device and a method for generating an occupancy map representing free and occupied space around a vehicle.

FIG. 2 illustrates the device 2 that performs a method of generating an occupancy map representing free and occupied space around the vehicle. The device 2 includes a unit 10 for estimating ego-motion, a unit 11 for estimating extrinsic orientation, a unit 12 for filtering and a unit 13 for mapping.

Two consecutive images captured by the camera 3 while the vehicle moves and a velocity information generated by the velocity sensor 4 serve as input 20 of the device 2 and the method performed by the device 2. Non-dynamic input data, which are assumed to be constant while driving, are the height of camera 3 above ground and the intrinsic calibration of the camera 3. In the following, extrinsic orientation is given by pitch and roll angles of the camera 3 relative to the road surface, and relative orientation is given by pitch and roll rotation motions of the camera 3 between the two camera positions from where the two consecutive images are taken.

At 21, optical flow vectors are computed from an equally distributed feature grid overlaying the two consecutive images. An optical flow vector linearly connects two points in the two images which represent the same object in the world. For example, a first point from the first image of the two images and a second point from the second image of the two images are selected, wherein the first and second points represent the same object. The optical flow vector then connects the first point and the second point. Such optical flow vectors are calculated for each grid point by a standard KLT (Kanade-Lucas-Tomasi) tracker.

At 22, the unit 10 uses the optical flow vectors for ego-motion estimation, i.e., the unit 10 estimates rotational and translational parameters. In particular, ego-motion estimation provides relative orientation of the camera 3, such as a relative pitch angle and a relative roll angle, as well as further parameters. Methods for estimating ego-motion are well known. For example, a method for estimating ego-motion is described in the European patent application no. 16 151 517.6 filed on Jan. 15, 2016, which is incorporated herein by reference.

At 23, the unit 10 checks if the estimated relative orientation is valid and/or useful. For example, a method for performing this step is described in the European patent application no. 16 162 369.6 filed on Mar. 24, 2016, which is incorporated herein by reference. If false, the method continues with 24 where the occupancy map is reset and the next images and velocity information are loaded. If true, the method continues with 25.

At 25, the unit 11 estimates the extrinsic orientation of the camera 3, which is needed for the transformation between the camera coordinate system and an occupancy map coordinate system. An example of estimating the extrinsic orientation is described in the European patent application no. 16 151 517.6 filed on Jan. 15, 2016, which is incorporated herein by reference.

At 26, the unit 11 checks if the extrinsic orientation estimation is valid and/or useful. For example, a method for performing this step is described in the European patent application no. 16 162 369.6 filed on Mar. 24, 2016, which is incorporated herein by reference.

If the extrinsic orientation estimation is valid and/or useful, the method proceeds to 27. The unit 12 updates the extrinsic orientation with the actual estimation of the extrinsic orientation. Further, a Kalman filter is updated. The method then continues with 28.

If the extrinsic orientation estimation is not valid and/or useful, the method continues with 29 where only the extrinsic orientation is predicted with the relative orientation of the ego-motion estimation and the Kalman filter is not updated.

At 30, the unit 12 checks if the Kalman filter is valid. In particular, the unit 12 checks if the predicted extrinsic orientation is still useful.

If true, the predicted extrinsic orientation is used for further processing and the method proceeds to 28. If false, a static extrinsic orientation is used for further processing at 31. The static extrinsic orientation can be determined while driving by temporal filtering of valid extrinsic orientation estimations.

The unit 13 estimates 3D points in the camera coordinate system by standard triangulation technique at 28. In particular, conventional structure from motion (SfM) technique is employed to estimate the 3D points in the environment of the vehicle.

At 32, uncertainty of 3D point estimation is estimated. The uncertainty of 3D point estimation is needed as input for the inverse sensor model described further below.

At 33, the position of the vehicle is updated. Further, the probability of occupancy for every cell in the occupancy map is updated based on an inverse sensor model that is described further below.

Since an image of a moving vehicle causes 3D points with false coordinates in general, a vehicle detector detects moving vehicles in the images at 34. The areas including a moving vehicle are not updated in the occupancy map in order to avoid wrong 3D points in the mapping process.

At 35, the updated occupancy map is output and can be used for other systems like path planning, emergency braking and collision warning.

In the following, the probabilistic inverse sensor model is explained that is used for generating the occupancy map.

The occupancy map is divided into different cells $M_{x,y}$ that are arranged in an x-y-plane of the occupancy map coordinate system, i.e., the ground coordinate system. Using conventional ray tracing techniques, rays can be generated from the camera 3 to each of the estimated 3D points in the environment of the vehicle as exemplarily illustrated in FIGS. 3A and 3B.

Figure 3A:
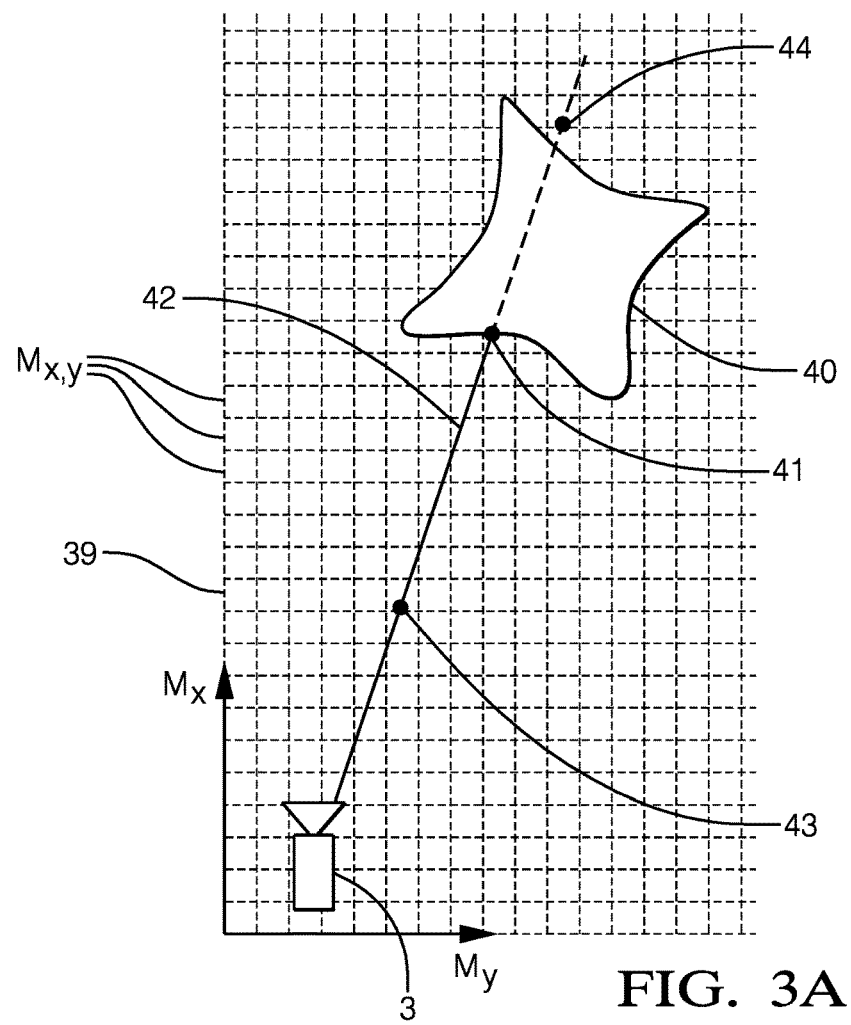
FIG. 3A a top view of a surface of a road surface with an example of a ray through a camera and an estimated 3D point.

FIG. 3A shows a top view of a surface 39 of a road surface, the camera 3 and an object 40, i.e., FIG. 3A shows the x-y-plane of the occupancy map coordinate system. Further, FIG. 3B shows a side view of the road surface, the camera 3 and the object 40, i.e., FIG. 3B shows an x-z-plane of the occupancy map coordinate system.

Figure 3B:
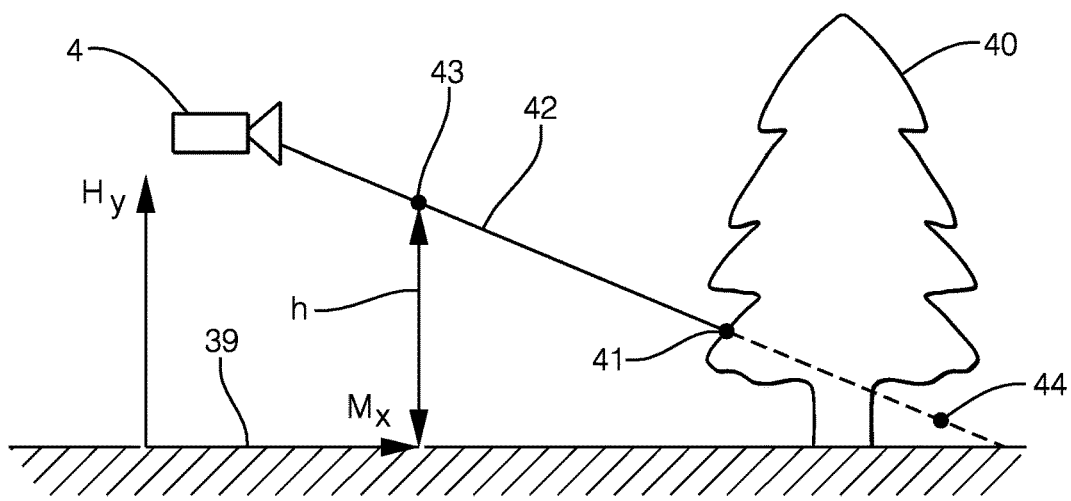
FIG. 3B a side view of the surface of the road surface shown in FIG. 3A.

As an example, FIGS. 3A and 3B illustrate a 3D point 41 that is located on the surface of the object 40 and can be seen in the images captured by the camera 3. A ray 42 is generated that is the line of light between the camera 3 and the 3D point 41.

FIG. 3A also illustrates the cells $M_{x,y}$. Intersection points of the ray 42 with the cells $M_{x,y}$ extending orthogonally from the x-y-plane into the 3D space define further 3D points in the environment of the vehicle. As an example, reference sign 43 denotes an intersection point of the space above one of the cells $M_{x,y}$ with the ray 42. Each 3D point is defined by a height h above ground and an Euclidean distance d between the respective 3D point and the 3D point on the respective ray where the ray hits the ground or an object. In case of the ray 42, the 3D point 41 is the 3D point where the ray 42 hits the object 40. Thus the distance d of the 3D point 43 is the Euclidean distance between the 3D points 41 and 43.

The well known "Occupancy Grid Map" theory is the basis for the environmental mapping. The update equation for a function $L_{x,y}$, the so-called log-odds ratio of the standard approach for time step t is $$L_{x,y}^t = \log \frac{P(M_{x,y} \mid w^t)}{1 - P(M_{x,y} \mid w^t)} + \log \frac{1 - P(M_{x,y})}{P(M_{x,y})} + L_{x,y}^{t-1}. \quad (11)$$

The inverse sensor model $P(M_{x,y} \mid w^t)$ considers the probability of occupancy based on the measurement $w^t$.

Based on the 3D point estimation and a ray tracing algorithm we are able to define different 3D points properties (point status)

$$S = \{hit, pass, covered\}. \quad (12)$$

The status S of a respective 3D point is S=hit in a probability-based sense if the 3D point hits an object or ground, i.e. the 3D point represents the object or ground. In the example shown in FIGS. 3A and 3B, the 3D point 41 has the status S=hit. The status S of a respective 3D point is S=pass if the 3D point is located between the camera 3 and the 3D point on the respective ray where the ray hits the ground or an object. In the example shown in FIGS. 3A and 3B, the 3D point 43 and also all other points located on the ray 42 between the camera 3 and the 3D point 41 have the status S=pass in a probability-based sense. The status S of a respective 3D point is S=covered if the 3D point is located on the respective ray beyond the 3D point on the respective ray where the ray hits an object. As an example, FIGS. 3A and 3B show a 3D point 44 with the status S=covered in a probability-based sense. Further, all 3D points on the ray 42 that are located on the side of the 3D point 41 opposite to the camera 3 have the status S=covered in a probability-based sense, i.e., the 3D point with the status S=covered are further away from the camera 3 than the 3D point 41.

Because multiple 3D points with their attached point status may occur within the same cell $M_{x,y}$, the update equation is extended by the different points i, where i denotes the 3D points located within the same cell $M_{x,y}$:

$$L_{x,y}^t = L_{x,y}^{t-1} + \Sigma_i \log \frac{P(M_{x,y} \mid w_i^t)}{1 - P(M_{x,y} \mid w_i^t)}. \quad (13)$$

The a-priori probability $P(M_{x,y})$ is assumed to be 0.5, therefore the term $$\log \frac{1 - P(M_{x,y})}{P(M_{x,y})}$$

vanishes.

In the following the inverse sensor model will be defined as $P(M_{x,y} \mid w_i) \, P(M_{x,y} \mid h_i, d_i)$, where $h_i$ is the height of the 3D point i above ground and $d_i$ is the Euclidean distance between the 3D point i on the line of sight and the related 3D point at the end of the line of sight.

There is no chance to model the complex inverse sensor model $P(M_{x,y} \mid h_i, d_i)$ in one go. Therefore, we need to dissemble it with the help of probability calculus and with considerations about the problem itself.

We start with a marginalization over set S $$P(M_{x,y} \mid h_i, d_i) = \Sigma_S P(M_{x,y}, S \mid h_i, d_i) \quad (14)$$

because we want to be able to model the point stati separately. By the definition of conditional probability we get $$\Sigma_S P(M_{x,y}, S \mid h_i, d_i) = \Sigma_S P(M_{x,y} \mid S, h_i, d_i) P(S \mid h_i, d_i). \quad (15)$$

The assumption of independence of $P(M_{x,y} \mid S, h_i, d_i)$ from the distance $d_i$ is reasonable because the occupancy probability is sufficiently coded by the point status S and the height $h_i$ of the 3D points i. Furthermore, we can assume an independence of $d_i$ from the height $h_i$ because the point status S is only defined by the distance $d_i$ on the line of sight. The height $h_i$ of the 3D points is irrelevant for the point status S.

These findings enable us to write $$\Sigma_S P(M_{x,y}|S,h_i,d_i)P(S|h_i,d_i) \stackrel{a}{=} \Sigma_S P(M_{x,y}|S,h_i)P(S|d_i), \quad (16)$$

which is an important part of the derivation. Next, we make use of the Bayes rules which leads to an elegant formulation of the probability of occupancy for every cell $M_{x,y}$ $$\Sigma_S \, P(M_{x,y}|S, h_i) \, P(S|d_i) = \Sigma_S \, P(M_{x,y}|S, h_i) \frac{L(S|d_i)P(S)}{P(d_i)}, \quad (17)$$

whereas L is a likelihood of the point status S dependent on the distance $d_i$. With the well known relation $P(d_i)=\Sigma_S L(S|d_i)P(S)$ we find our final inverse sensor model $$P(M_{x,y}|h_i, d_i) = \Sigma_S \, P(M_{x,y}|S, h_i) \frac{L(S|d_i)}{\Sigma_S L(S|d_i)}. \quad (18)$$

The term $P(M_{x,y}|h_i,d_i)$ may be formulated as $$P(M_{x,y}|h_i,d_i) = \phi_{Th}\phi_{Td} + \phi_{Dh}\phi_{Dd} + \phi_{Vh}\phi_{Vd} \quad (19)$$

with functions $\phi_{Th}$, $\phi_{Dh}$ and $\phi_{Vh}$ each generating a probability and functions $\phi_{Td}$, $\phi_{Dd}$ and $\phi_{Vd}$ each generating a likelihood:

$$\phi_{Th} = P(M_{x,y}|S = \text{hit}, h_i), \quad (20)$$

$$\phi_{Dh} = P(M_{x,y}|S = \text{pass}, h_i), \quad (21)$$

$$\phi_{Vh} = P(M_{x,y}|S = \text{covered}, h_i), \quad (22)$$

$$\phi_{Td} = \frac{L(S = \text{hit}|d_i)}{L(S = \text{hit}|d_i) + L(S = \text{pass}|d_i) + L(S = \text{covered}|d_i)}, \quad (23)$$

$$\phi_{Dd} = \frac{L(S = \text{pass}|d_i)}{L(S = \text{hit}|d_i) + L(S = \text{pass}|d_i) + L(S = \text{covered}|d_i)}, \text{ and} \quad (24)$$

$$\phi_{Vd} = \frac{L(S = \text{covered}|d_i)}{L(S = \text{hit}|d_i) + L(S = \text{pass}|d_i) + L(S = \text{covered}|d_i)}. \quad (25)$$

The functions $\phi_{Th}$, $\phi_{Dh}$ and $\phi_{Vh}$ as well as the functions $\phi_{Td}$, $\phi_{Dd}$ and $\phi_{Vd}$ have to be modelled. The definitions of the functions are based on considerations and detailed observations related to the environment in which a vehicle usually moves and will be explained in the following.

Figure 4:
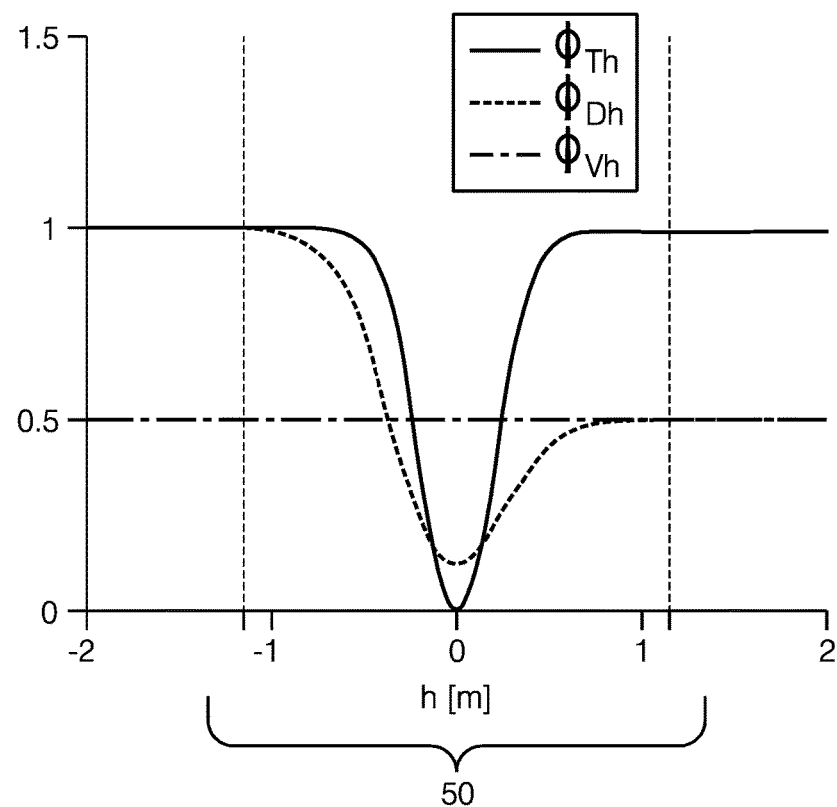
FIG. 4 modelling of an inverse sensor model in dependence on the height h.

Initially the modelling of the functions $\phi_{Th}$, $\phi_{Dh}$ and $\phi_{Vh}$ takes place in dependence on the height h of the respective 3D point over the surface 39 of the road surface. The functions $\phi_{Th}$, $\phi_{Dh}$ and $\phi_{Vh}$ in dependence of the height h are illustrated in FIG. 4.

Definition of the Function $\phi_{Th}$:

The function $\phi_{Th}$ states the probability of occupancy in dependence on the height h of the hit relative to the road surface (ground). For a hit in the vicinity of the ground, i.e. around h=0, the probability of the occupancy is low, as low objects are assumed to be free space. For a hit above the road surface or ground, i.e. h>0, the probability of occupancy increases with increasing height. The boundary between free space and occupied space, i.e. $\phi_{Th}$=0.5, is defined at 25 cm by the Gaussian function illustrated in FIG. 4. In this way it is ensured that obstacles are recognized and, on the other hand, that erroneous detections are prevented. A high probability of occupancy should also be generated for descending bushes or trenches at the side of the road surface which is ensured with the aid of the selected Gaussian function $\phi_{Th}$ which is axis symmetrical for h<0.

Figure 5:
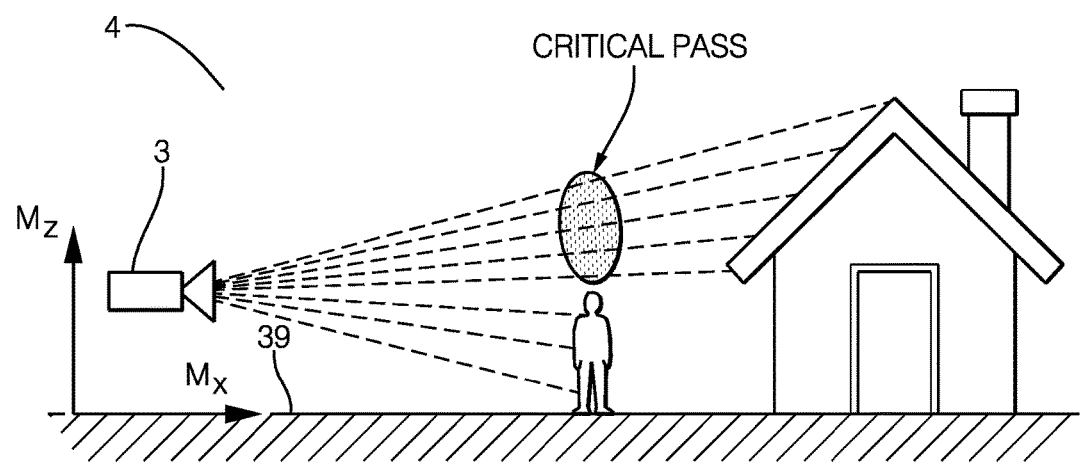
FIG. 5 a schematic representation of critical passes.

Definition of the Function $\phi_{Dh}$:

If a pass (or runaway) is present, then the probability of occupancy in the vicinity of the ground is likewise low as can be recognized with reference to function $\phi_{Dh}$ in FIG. 4. With increasing height of the pass, the probability of occupancy has to increase to a value of 0.5. However, the value 0.5 is not allowed to be exceeded. The reason for this is emphasized in FIG. 5. If the probability would be less than the value of 0.5 for a pass, then a high pass, a so-called critical pass, which can be for example formed by a house wall, would reduce the probability of occupancy which would be brought about by an object, e.g. a person, present in the viewing ray. A reduction of the probability for objects that are present in front of the object in the viewing ray is in any way not desired and is prevented by the modelled function.

For a pass beneath the ground height, i.e. h<0, the probability of occupancy increases in contrast to the hits lying above the road surface beyond the value of 0.5. Basically this would lead to a probability of occupancy that does not correspond to the real probability of occupancy, as no object is present there. However, this modelling was selected due to the application of the mapping, as this region should be mapped as not being passable or occupied, e.g. descending bushes and trenches.

The function $\phi_{Dh}$ has a minimum in a range 50 for $h_i$ around $h_i$=0 and assumes the value 1 for values of $h_i$ that are smaller than the range 50 and assumes the value 0.5 for values of $h_i$ that are greater than the range 50.

Definition of the Function $\phi_{Vh}$:

Thereby 3D points arise having the status S=covered. The function $\phi_{Vh}$ is assumed to be constant independent of the height having the value 0.5, as it cannot be determined what lies behind the object.

Figure 6:
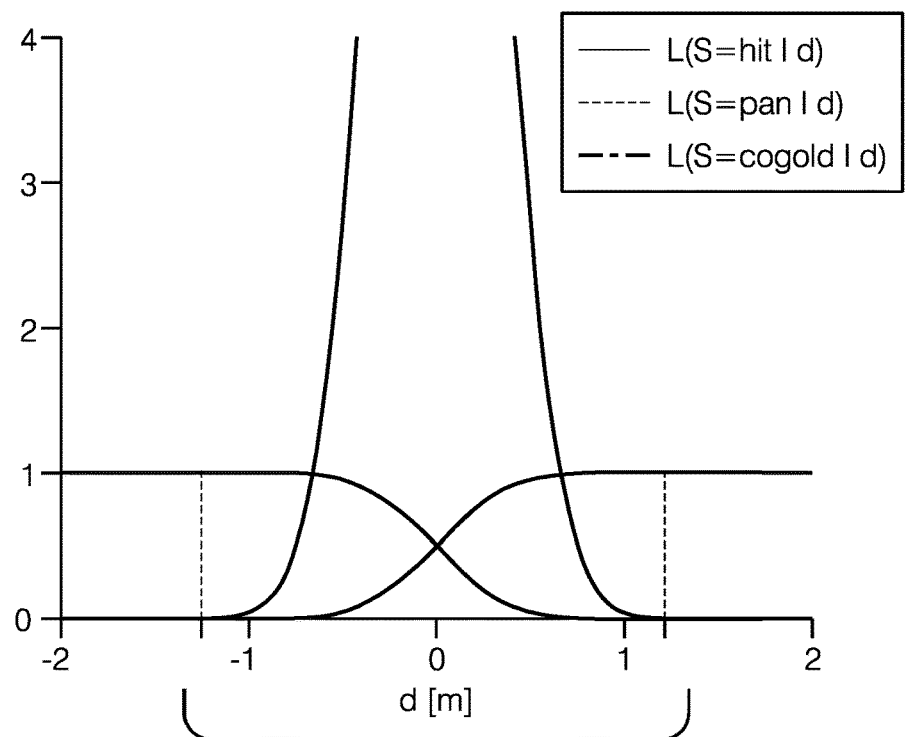
FIG. 6 modelling of the inverse sensor model in dependence on the distance d.
Figure 7:
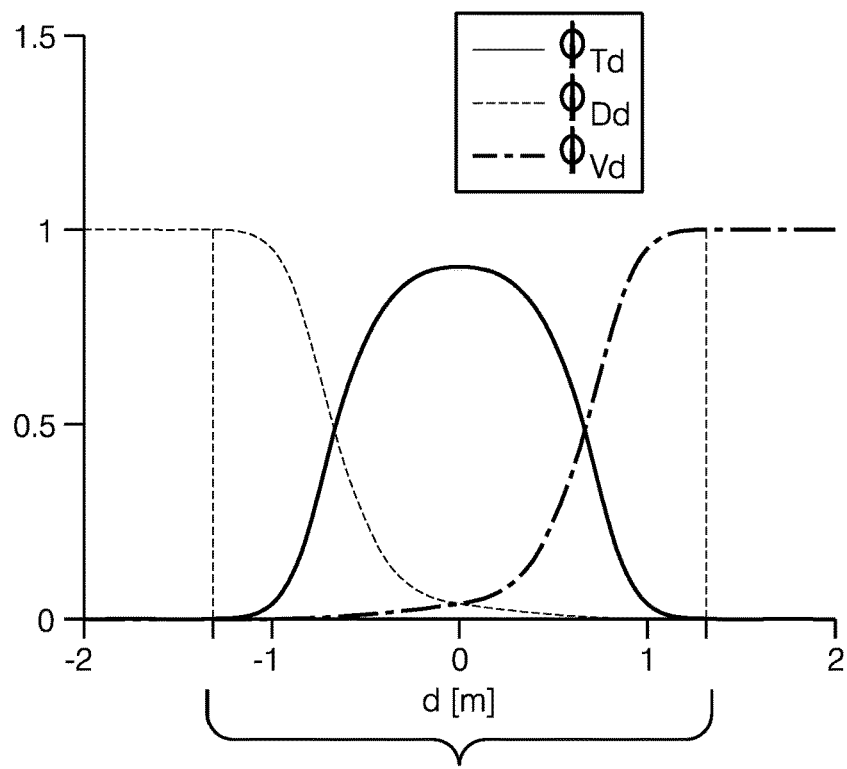
FIG. 7 normalized model of the inverse sensor model in dependence on the distance d.

The functions $\phi_{Td}$, $\phi_{Dd}$ and $\phi_{Vd}$ are not directly modelled, as they result from a normalization of the likelihoods L(S=hit|d), L(S=pass|d) and L(S=covered|d) by the term $\Sigma_S L(S|d)$. Rather the original functions are modelled. The definitions of the functions are motivated on the basis of the following considerations. The graphical illustration of the selected function can be found in FIG. 6. The likelihood functions arising by way of the normalization are illustrated in FIG. 7.

Definition of the Likelihood L(S=Hit|d):

The function L (S=hit|d) states the likelihood for a hit on dependence on the distance d. On the assumption that the scattering of the point estimation along the viewing ray is distributed normally, this likelihood corresponds to a Gaussian function. With an increasing distance to the associated 3D point (d=0), the likelihood of d for a hit decreases in the positive direction (d>0 towards the camera) and also in the negative direction (d<0 away from the camera).

The 3D point estimation accuracy is calculated depending on the relative position of the estimated 3D point to the camera, the relative position of the camera from where the images are captured between the two different points in time and the optical flow estimation accuracy. The 3D point estimation accuracy is calculated for each 3D point. In this way the uncertainties of the 3D points can be considered as true to reality as possible in the derived probabilistic model. The uncertainty of the 3D point along the line of sight is directly used for the modelling of the Gaussian function L(S=hit|d). A further scaling of the function ensures a weighting tuned to the other functions on the normalization by $\Sigma_S L(S|d)$.

Definition of the Likelihood L(S=pass|d):

The ray tracing starting from the 3D point in the direction of the camera 3 provides 3D points with increasing distance which are referred to as pass (or runaway). For this reason the associated likelihood increases for a pass L(S=pass|d) with increasing spacing from the associated hit. No pass can lie behind the object. However, as the 3D point estimation contains an uncertainty, a continuous decrease of the likelihood L(S=pass|d) is also modelled to the value "0" in this case.

The likelihood L(S=pass|d) has a transition area for values of $d_i$ in a range 51 around $d_i=0$ where the likelihood L(S=pass|d) rises from the value 0 to the value 1, wherein the likelihood L(S=pass|d) assumes the value 0 for values of $d_i$ that are smaller than the range 51 and assumes the value 1 for values of $d_i$ that are greater than the range 51.

Definition of the Likelihood L(S=Covered|d):

On the basis of the ray tracing behind the 3D point up until the plane of the road surface, points arise with the status S=covered. With respect to the region behind the 3D point it thus becomes more probable to meet a covered point. For this reason L(S=covered|d) increases for points d<0 and vice versa decreases for points d>0.

The likelihood L(S=covered|d) has a transition area for values of $d_i$ in the range 51 around $d_i=0$ where the likelihood L(S=covered|d) falls from the value 1 to the value 0, wherein the likelihood L(S=covered|d) assumes the value 1 for values of $d_i$ that are smaller than the range 51 and assumes the value 0 for values of $d_i$ that are greater than the range 51.

Figure 8:
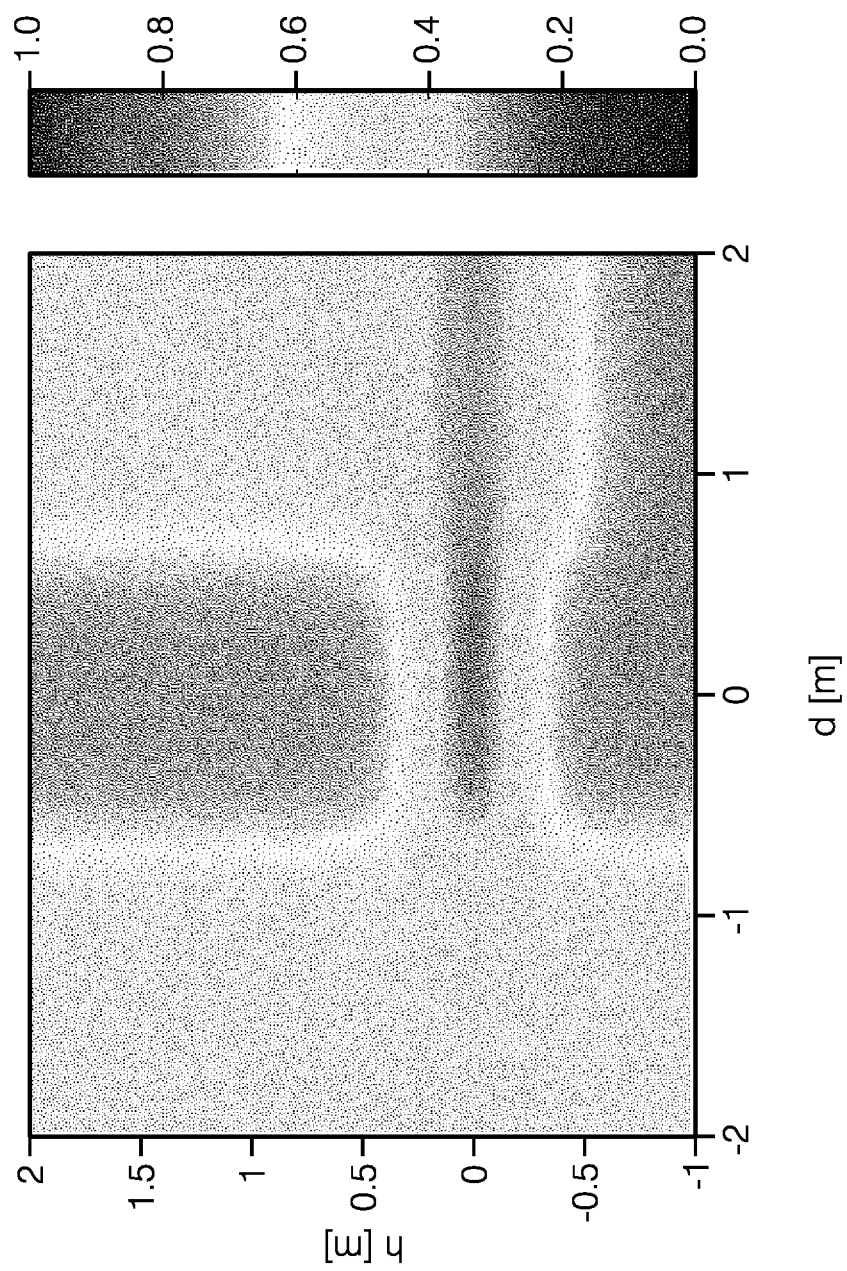
FIG. 8 a representation of the inverse sensor model in dependence on the height h and the distance d.

In FIG. 8 the inverse sensor model $P(M_{x,y}|h_i,d_i)$ is illustrated in dependence on the height h and the distance d, which each 3D point contributes to the determination of the occupancy map. Due to the probability of occupancy accumulated over time in equation (13) the inverse sensor model must be adapted for an individual point $P(M_{x,y}|h_i,d_i)$ by a factor $f_{scale}$.

$$P_{final}(M_{x,y}|h_i,d_i)=f_{scale}(P(M_{x,y}|h_i,d_i)-0.5)+0.5, \quad (26)$$

in this way a probability of occupancy of the map arises that can be directly used for the object detection. As evaluation shows, the value $f_{scale}=0.1$ provides good results on the mapping of the environment of the vehicle.

Generally the properties determined and desired above for modelling the functions $\phi_{Th}$, $\phi_{Dh}$ and $\phi_{Vh}$ and the functions $\phi_{Td}$, $\phi_{Dd}$ and $\phi_{Vd}$ can be reproduced in $P_{final}(M_{x,y}|h_i,d_i)$ as described in the following paragraph.

For h in the range of 0 m the hits and passes are evaluated as free space. In contrast to this covered points are increasingly evaluated with a probability of 0.5 for a height smaller than 0 m. Hits and passes beneath the road surface generate a high probability of occupancy which is desired due to trenches etc. In contrast to this hits above the plane of the road surface lead to a high probability of occupancy which is required for the detection of objects. Passes above the road surface are not allowed to change the current probability of occupancy, as described above, which also does not happen for this case due to the value of P=0.5. The height region beneath the road surface for covered points has no relevance as the ray tracing of the covered points is only carried out up to the height of the road surface.

Figure 9:
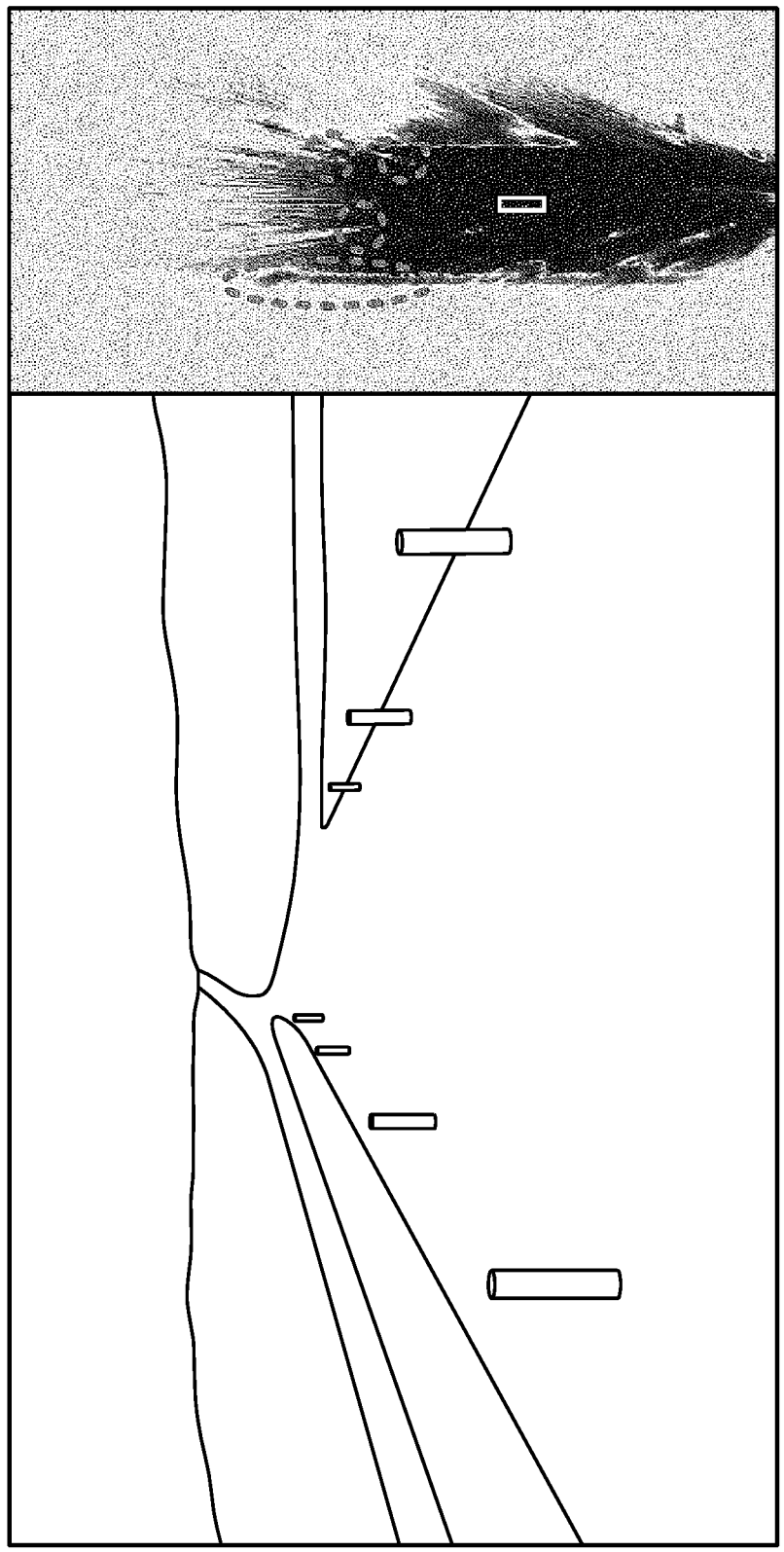
FIG. 9 an example of an occupancy map.

FIG. 9 shows an example of an occupancy map generated with the method described herein. On the left side of FIG. 9 a schematic representation of an image captured by the camera is shown. The resulting occupancy map is depicted on the right side (40 m×80 m, cell size 20 cm×20 cm). Light colors mean high probability of occupancy, dark colors mean low probability of occupancy. As it can be seen the free space is clearly visible. In addition, the objects in the scene are correctly mapped with a high probability of occupancy.

We claim:

1. A method of generating an occupancy map representing free and occupied space around a vehicle, wherein the occupancy map is divided into a plurality of cells $M_{x,y}$, the method comprising:

capturing two consecutive images by a camera (3) mounted on the vehicle;

generating optical flow vectors from the two consecutive images;

estimating 3D points in the space around the vehicle from the optical flow vectors;

generating rays from the camera (3) to each of the estimated 3D points, wherein the cells $M_{x,y}$ structure the space around the vehicle and intersection points of the rays with the cells $M_{x,y}$ in the space around the vehicle define further 3D points;

determining for each of the cells $M_{x,y}$ a function $L_{x,y}^t$ for a time step t:

$$L_{x,y}^t = L_{x,y}^{t-1} + \Sigma_i \log \frac{P(M_{x,y}|h_i,d_i)}{1-P(M_{x,y}|h_i,d_i)},$$

wherein i denotes the 3D points located within the respective cell $M_{x,y}$ and each of the 3D points i is defined by a height $h_i$ above ground and a distance $d_i$ between the 3D point i and a 3D point on the respective ray where the ray hits the ground or an object, wherein $P(M_{x,y}|h_i,d_i)$ is a function of $$\Sigma_S \, P(M_{x,y}|S,h_i) \frac{L(S|d_i)}{\Sigma_S L(S|d_i)},$$

wherein $P(M_{x,y}|S,h_i)$ is an occupancy probability contribution of a 3D point i dependent on a status S of the 3D point i and the height $h_i$, $L(S|d_i)$ is a likelihood of the status of the 3D point i dependent on the distance $d_i$, and S={hit, pass, covered}, wherein the status S of a 3D point i is S=hit if the 3D point hits the ground or an object, S=pass if the 3D point is located between the camera (3) and the 3D point on the respective ray where the ray hits the ground or an object, and S=covered if the 3D point is located on the respective ray beyond the 3D point on the respective ray where the ray hits an object; and determining an occupancy probability from the function $L_{x,y}^t$ for each of the cells $M_{x,y}$.

2. The method as claimed in claim 1, wherein $P(M_{x,y}|h_i,d_i)$ is given by $$P(M_{x,y}|h_i,d_i)\phi_{Th}\phi_{Td}+\phi_{Dh}\phi_{Dd}+\phi_{Vh}\phi_{Vd}$$

with functions $\phi_{Th}$, $\phi_{Dh}$ and $\phi_{Vh}$ each generating a probability and functions $\phi_{Td}$, $\phi_{Dd}$ and $\phi_{Vd}$ each generating a likelihood:

$$\phi_{Th} = P(M_{x,y}|S=\text{hit},h_i),$$

-continued $$\phi_{Dh} = P(M_{x,y} \mid S = \text{pass}, h_i),$$

$$\phi_{Vh} = P(M_{x,y} \mid S = \text{covered}, h_i),$$

$$\phi_{Td} = \frac{L(S = \text{hit} \mid d_i)}{L(S = \text{hit} \mid d_i) + L(S = \text{pass} \mid d_i) + L(S = \text{covered} \mid d_i)},$$

$$\phi_{Dd} = \frac{L(S = \text{pass} \mid d_i)}{L(S = \text{hit} \mid d_i) + L(S = \text{pass} \mid d_i) + L(S = \text{covered} \mid d_i)}, \text{ and}$$

$$\phi_{Vd} = \frac{L(S = \text{covered} \mid d_i)}{L(S = \text{hit} \mid d_i) + L(S = \text{pass} \mid d_i) + L(S = \text{covered} \mid d_i)}.$$

3. The method as claimed in claim 2, wherein the function $\phi_{Th}$ is an inverted Gaussian function with a minimum at $h_i=0$.

4. The method as claimed in claim 3, wherein the function $\phi_{Dh}$ has a minimum in a first range (50) for $h_i$ around $h_i=0$ and assumes 1 for values of $h_i$ that are smaller than the first range (50) and assumes the constant value for values of $h_i$ that are greater than the first range (50).

5. The method as claimed in in claim 2, wherein the function $\phi_{Vh}$ assumes a constant value for all values of $h_i$.

6. The method as claimed in claim 2, wherein the function $\phi_{Dd}$ is a Gaussian function with a maximum at $h_i=0$.

7. The method as claimed in claim 2, wherein the function $\phi_{Dd}$ has a transition area for values of $d_i$ in a second range (51) around $d_i=0$ where the function $\phi_{Dd}$ rises from 0 to 1, wherein the function $\phi_{Dd}$ assumes 0 for values of $d_i$ that are smaller than the second range (51) and assumes 1 for values of $d_i$ that are greater than the second range (51).

8. The method as claimed in claim 2, wherein the function $\phi_{Vd}$ has a transition area for values of $d_i$ in a second range (51) around $d_i=0$ where the function $\phi_{Vd}$ falls from 1 to 0, wherein the function $\phi_{Vd}$ assumes 1 for values of $d_i$ that are smaller than the second range (51) and assumes 0 for values of $d_i$ that are greater than the second range (51).

9. The method as claimed in claim 1, wherein the occupancy probability is determined from the function $L_{x,y}^t$ for each of the cells $M_{x,y}$ by $$P^t(M_{x,y}) = 1 - \frac{1}{1 + e^{L_{x,y}^t}}.$$

10. The method as claimed in claim 1, wherein the occupancy map is used as an input for a driver assistance system or a system for autonomous driving, in particular a system for path planning for autonomous driving, a system for obstacle detection, a system for lane departure warning, a system for forward collision warning or a system for autonomous emergency braking.

11. A device for generating an occupancy map representing free and occupied space around a vehicle, wherein the occupancy map is divided into a plurality of cells $M_{x,y}$, the device is configured to
receive two consecutive images captured by a camera mounted on the vehicle,
generate optical flow vectors from the two consecutive images,
estimate 3D points in the space around the vehicle from the optical flow vectors,
generate rays from the camera to each of the estimated 3D points, wherein the cells $M_{x,y}$ structure the space around the vehicle and intersection points of the rays with the cells $M_{x,y}$ in the space around the vehicle define further 3D points,
determine for each of the cells $M_{x,y}$ a function $L_{x,y}^t$ for a time step t:

$$L_{x,y}^t = L_{x,y}^{t-1} + \Sigma_i \log \frac{P(M_{x,y} \mid h_i, d_i)}{1 - P(M_{x,y} \mid h_i, d_i)},$$

wherein i denotes the 3D points located within the respective cell $M_{x,y}$ and each of the 3D points i is defined by a height $h_i$ above ground and a distance $d_i$ between the 3D point i and a 3D point on the respective ray where the ray hits the ground or an object,
wherein $P(M_{x,y} \mid h_i, d_i)$ is a function of $$\Sigma_S \, P(M_{x,y} \mid S, h_i) \frac{L(S \mid d_i)}{\Sigma_S \, L(S \mid d_i)},$$

wherein $P(M_{x,y} \mid S, h_i)$ is an occupancy probability contribution of a 3D point i dependent on a status S of the 3D point i and the height $h_i$, $L(S \mid d_i)$ is a likelihood of the status of the 3D point i dependent on the distance $d_i$, and S={hit, pass, covered}, wherein the status S of a 3D point i is S=hit if the 3D point hits the ground or an object, S=pass if the 3D point is located between the camera (3) and the 3D point on the respective ray where the ray hits the ground or an object, and S=covered if the 3D point is located on the respective ray beyond the 3D point on the respective ray where the ray hits an object; and
determine an occupancy probability from the function $L_{x,y}^t$ for each of the cells $M_{x,y}$.

12. A system comprising: a device for generating an occupancy map as claimed in claim 11, and a driver assistance system or a system for autonomous driving, wherein the occupancy map is input in the driver assistance system or the system for autonomous driving.

* * * * *